United States Patent
Lim et al.

(10) Patent No.: US 8,648,570 B2
(45) Date of Patent: Feb. 11, 2014

(54) METHOD FOR BALANCING OF HIGH VOLTAGE BATTERY PACK

(75) Inventors: Jae Hwan Lim, Daejeon (KR); Se Kyung Han, Gwangmyeong-si (KR)

(73) Assignee: SK Innovation Co., Ltd., Seoul (KR)

( * ) Notice: Subject to any disclaimer, the term of this patent is extended or adjusted under 35 U.S.C. 154(b) by 198 days.

(21) Appl. No.: 12/808,331

(22) PCT Filed: Dec. 3, 2008

(86) PCT No.: PCT/KR2008/007116
§ 371 (c)(1),
(2), (4) Date: Jun. 15, 2010

(87) PCT Pub. No.: WO2009/084821
PCT Pub. Date: Jul. 9, 2009

(65) Prior Publication Data
US 2010/0277123 A1    Nov. 4, 2010

(30) Foreign Application Priority Data
Dec. 31, 2007    (KR) .......................... 10-2007-0141870

(51) Int. Cl.
*H02J 7/00*    (2006.01)
(52) U.S. Cl.
USPC .......................................... 320/118; 320/119
(58) Field of Classification Search
USPC .......................................... 320/116, 118, 119
See application file for complete search history.

(56) References Cited

U.S. PATENT DOCUMENTS

| 6,127,806 | A | * | 10/2000 | Tanjo et al. | 320/132 |
|---|---|---|---|---|---|
| 6,424,157 | B1 | | 7/2002 | Gollomp et al. | |
| 6,646,419 | B1 | * | 11/2003 | Ying | 320/132 |
| 7,688,075 | B2 | * | 3/2010 | Kelley et al. | 324/426 |
| 2004/0135546 | A1 | * | 7/2004 | Chertok et al. | 320/118 |
| 2005/0073315 | A1 | * | 4/2005 | Murakami et al. | 324/433 |
| 2005/0264263 | A1 | | 12/2005 | Tsenter | |
| 2006/0022639 | A1 | | 2/2006 | Moore | |
| 2006/0097698 | A1 | * | 5/2006 | Plett | 320/118 |
| 2007/0145948 | A1 | | 6/2007 | Lim et al. | |
| 2007/0194791 | A1 | | 8/2007 | Huang | |
| 2008/0150491 | A1 | * | 6/2008 | Bergveld et al. | 320/139 |

FOREIGN PATENT DOCUMENTS

| JP | 2002365347 A | 12/2002 |
|---|---|---|
| JP | 2004080909 A | 3/2004 |
| JP | 2005151720 A | 6/2005 |
| JP | 2007174865 A | 7/2007 |
| KR | 1020060060830 A | 6/2006 |
| KR | 1020060083343 | 7/2006 |
| KR | 100680901 | 2/2007 |
| WO | 2005055358 A2 | 6/2005 |

* cited by examiner

*Primary Examiner* — Yalkew Fantu
*Assistant Examiner* — Manuel Hernandez
(74) *Attorney, Agent, or Firm* — The Webb Law Firm

(57) ABSTRACT

The present invention relates to a cell balancing method for a high-voltage battery pack, and the method comprises steps of a) measuring an electromotive force of each cell composing the battery pack; b) selecting the cell to be balanced based on the electromotive force of the each cell; c) computing a total amount of charges used for balancing of the cell to be balanced; d) obtaining an accumulative amount of charges by accumulating an amount of current consumed for the balancing while performing the balancing of the cell to be balanced; and e) completing the balancing of the cell to be balanced when the accumulative amount of charges equals the total amount of charges.

3 Claims, 2 Drawing Sheets

METHOD FOR BALANCING OF HIGH VOLTAGE BATTERY PACK

TECHNICAL FIELD

The present invention relates to a cell balancing method for high-voltage battery pack, and more particularly, to a cell balancing method capable of preventing a state of charge (SOC) difference between cells in a battery pack having a plurality of cells connected in series/parallel.

BACKGROUND ART

The battery system of high voltage (at least 60V) having the plurality of cells connected in series/parallel has a voltage deviation between the cells occurred due to cell production process, capacity difference and self-discharge effect before/after being driven, as well as a voltage deviation between the cells occurred due to temperature irregularity within the battery system and structure difference in the battery packs upon being driven.

Such voltage deviation results in hindering battery voltage irregularity in accordance with operations of the battery mounted in a vehicle, further leading to battery deterioration and lifetime reduction.

Therefore, such high-voltage battery system reduces the deviation between the cells by mounting a cell balancing circuit. The cell balancing circuit is connected to a Battery Management System (BMS) which is a battery controller. The cell balancing circuit includes a Passive Cell Balancing circuit of a resistor discharge method and an Active Cell Balancing circuit of a DC/DC converter.

The existing Passive Cell Balancing circuit obtains information on the voltage deviation between the cells through a real-time voltage measurement, and determines whether the balancing operation is performed or not based on the information. In other words, it is a closed-loop circuit of voltage feedback method which causes start and end of balancing to be determined by real-time voltage sensing.

Korean Patent Application Publication No. 2006-0083343 relates to battery equalization method of battery pack provided with a plurality of batteries, which comprises a step of detecting a voltage for each of a plurality of batteries, a step of computing a mean value of the plurality of battery voltages detected, a step of setting a balancing target range based on the voltage mean value computed, a step of determining whether or not a battery to be balanced exists of which the battery voltage detected is contained in the balancing target range, a step of selecting the highest voltage battery and the lowest voltage battery of the batteries to be balanced if it is determined that the battery to be balanced exists, and a step of balancing the cell in such a way that the highest voltage battery is discharged and correspondingly the lowest voltage battery is charged until the voltage mean value is reached by connecting the highest voltage battery and the lowest voltage battery in parallel.

Korean Patent Registration No. 0680901 relates to a battery management system which is provided with a master module and a plurality of slave modules, which comprises a step of confirming a mode of a battery pack which each slave module manages in a master module, a step of selecting a lowest cell voltage by monitoring a cell voltage of each battery cell configured within the battery pack if the battery pack is in any one of charging mode, rest mode or discharging mode as a result of confirmation, a step of comparing the selected lowest cell voltage with the cell voltage of each battery cell monitored to perform discharge for a prescribed discharge time for the battery cell in which the voltage difference is greater than a predetermined threshold, and a step of cell balancing the battery pack by repeating the step of selecting the lowest cell voltage, the step of confirming the threshold range and the step of performing discharge until the cell voltage between each battery cell is not more than the threshold.

U.S. Laid Open Patent No. 2007-0194791 relates to a method for monitoring a battery state by measuring an internal resistance, which comprises a step of measuring each of a voltage applied to the battery and a voltage applied to a first external resistor after connecting the battery cell with the first external resistor, a step of measuring each of the voltage applied to the battery and a voltage applied to a second external resistor after connecting the battery cell with the second external resistor, a step of computing a resistance value of the battery using a current value computed by the voltage applied to the first external resistor and the voltage applied to the second external resistor, the voltage applied to the battery when the first external resistor is connected, the voltage applied to the battery when the second external resistor is connected to compare it with predetermined resistance value, and a step of issuing an alarm if the battery has abnormal resistance value.

U.S. Pat. No. 6,424,157 relates to a method of monitoring a state of a battery disposed in a vehicle, in which the method computes a battery dynamic internal resistance IR, a dynamic polarization resistance PR, Quiescent voltage and computes correct state of charge (SOC) based on the computed values, based on a voltage value using a sensor measuring a voltage of the battery when the engine is started up and a current value measured using a sensor measuring a current drain of the battery when the engine is started up.

WO 2005/055358 relates to a method of equalizing batteries connected in series, in which the method comprises a step of measuring charging level of the battery cells connected in series, a step of performing a balancing step by adjusting a charging current level of each cell in accordance with the charging level of each cell and a step of equalizing the batteries by repeating the steps.

However, if the balancing is performed by measuring the battery voltage as in Korean Patent Application Publication No. 2006-0083343, the battery voltage may contain properties of an electromotive force, a voltage of a resistor component, and a polarization voltage caused by reaction to generate nonlinear voltage according to an amount of currents upon being driven. In other words, the terminal voltage of the battery is represented by summing the electromotive force, the IR voltage and the polarization voltage. However, the current frequently flows in a state where the vehicle is driven and thus the voltage measured at a terminal is different from the battery electromotive force due to actions of the IR voltage and the polarization voltage. Even if the current does not flow through the vehicle, the balancing current flows due to the cell balancing itself, whereby correct electromotive force can not be achieved.

A main target of the cell balancing is to remain the electromotive force between the cells at the same level. If the balancing current flows, however, it is difficult to correctly control the electromotive force at the desired level by a cell balancing logic based on real-time terminal voltage.

The cell under the course of balancing can have a bad influence since a reverse phenomenon can be happened which makes lost electromotive force greater than the target cell voltage due to a terminal voltage overestimated than the electromotive force.

DISCLOSURE

Technical Problem

An object of the present invention is to provide a cell balancing method for the battery pack having the cells connected in series, in parallel or series/parallel based on a cell electromotive force measured without influences by IR voltage and polarization voltage and other object of the present invention is to provide a cell balancing method for each cell composing the battery pack based on the value obtained by computing a total amount of charges needed for balancing not a terminal voltage measured in real time.

Technical Solution

A cell balancing method for a high-voltage battery pack according to the present invention comprising steps of a) measuring an electromotive force of each cell composing the battery pack; b) selecting the cell to be balanced based on the electromotive force of the each cell; c) computing a total amount of charges used for balancing of the cell to be balanced; d) obtaining an accumulative amount of charges by accumulating an amount of current consumed for the balancing while performing the balancing of the cell to be balanced; and e) completing the balancing of the cell to be balanced when the accumulative amount of charges equals the total amount of charges.

The step of measuring the electromotive force of each cell in the step a) further comprises steps of a1) discriminating whether or not a zero current state exists in which the current is not supplied from the battery pack to a load connected to the battery pack; a2) measuring the terminal voltage of each cell composing the battery pack to use the measured terminal voltage of each cell as the electromotive force of each cell when a duration time of the zero current state is greater than a first threshold time t1, if the zero current state exists; a3) measuring the terminal voltage of each cell composing the battery pack to use the measured terminal voltage of each cell as the electromotive force of each cell when the current of the battery pack of less than a threshold amount of current i1 flows for greater than a second threshold time t2, if the zero current state does not exist.

If the current is supplied to a load connected to the battery pack (for example, if vehicle is driven), there is higher possibility that the voltage measured can not be a genuine electromotive force (Open Circuit Voltage) of the cell while the battery pack is supplying the current to the load since large amount of currents can flow and the amount of currents can be rapidly varied.

The cell balancing method according to the present invention selects the cell to be balanced, performs the balancing on each cell, and computes total amount of charges needed for balancing, based on the electromotive force which is credible, instead of incorrect terminal voltage.

The error of the terminal voltage is caused by IR voltage and polarization voltage, as mentioned above. When the zero current state is maintained for a prescribed time, the terminal voltage measured is used as the cell electromotive force.

Further, if the zero current state does not exist, when a amount of current flowing the battery pack is sufficiently low to neglect the error due to IR voltage (low current state) and such low amount of current is maintained for a prescribed time to neglect the polarization voltage, the terminal voltage is measured and used as the electromotive force of the cell.

Therefore, it is possible to obtain the correct electromotive force of the cell without the error due to IR voltage and the error due to polarization voltage, and thus perform the balancing step using it.

Herein, the first threshold time t1 for which the zero current state is maintained is preferably 30 seconds to 60 seconds. If the first threshold time t1 is less than 30 seconds, the influence due to polarization voltage can not be excluded, and if the first threshold time t1 is greater than 60 seconds, the effect of excluding polarization voltage is a little increased but likelihood of the zero current state is lower and thus efficient balancing is difficult to achieve.

Also, the second threshold time t2 for which the low current state is maintained is preferably 30 seconds to 60 seconds. If the second threshold time t2 is less than 30 seconds, the influence due to polarization voltage which depends on amount of charges flowing before the low current state can not be excluded, and if the second threshold time t2 is greater than 60 seconds, the effect of excluding polarization voltage is a little increased but likelihood of the zero current state is lower and thus efficient balancing is difficult to achieve.

The threshold amount of current i1 which determines the low current state is preferably up to 3 A. If the threshold amount of current i1 is more than 3 A, the error due to IR voltage and polarization voltage can not be excluded. Since the zero current state is changed to the low current state if a finite amount of current flows, the lower limit of the threshold amount of current i1 is meaningless. Substantially, the threshold amount of current it is more than 0.01 A of a minimum current which can be measured by typical current sensor.

The current is measured at a prescribed time interval in order to determine whether the zero current state or the low current state is maintained for greater than a prescribed time, and the current is preferably measured at an interval of 0.01 to 0.1 second.

The first threshold time t1, the second threshold time t2, or the threshold amount of current i1 are determined for a battery pack for use in electric vehicle or hybrid vehicle requiring high voltage and high current battery pack, particularly lithium ion battery pack and lithium polymer ion battery pack, by way of many experiments and computations.

The step b) selects the cell to be balanced based on the electromotive force of the cell obtained in the step a), and preferably selects the cell having a deviation greater than an allowable deviation from a lowest electromotive force as the cell to be balanced, based on the lowest electromotive force of cell. Herein, the deviation is percentage obtained by dividing a difference subtracting the lowest electromotive force from the electromotive force of each cell composing the battery pack by the lowest electromotive force.

The cell to be balanced having a deviation greater than the allowable deviation is subject to the balancing step to have a deviation within the allowable deviation.

The allowable deviation is preferable in a range of 2% to 5%. If the allowable deviation is less than 2%, the equalization effect is low whereas the number of cells to be balanced is larger and thus balancing effect is reduced, and if the allowable deviation is more than 5%, the equalization is not accomplished.

Herein, the step b) obtains the state of charge (SOC) corresponding to the electromotive force of the cell using a lookup table of the electromotive force and the stat of charge (SOC), and thus the step b) can be performed based on the state of charge (SOC) of the cell instead of the electromotive force of the cell. If the step b) is performed based on the SOC but the cell electromotive force, the deviation becomes a percentage obtained by dividing the difference subtracting the lowest SOC from the SOC of each cell by the lowest SOC, and the allowable deviation can be changed into the allowable deviation of proper SOC by the lookup table.

After the cell to be balanced is selected based on the electromotive force or SOC in the step b), the total amount of charges needed for balancing of the cell to be balanced is computed in the step c)

Preferably, the total amount of charges is computed based the SOC of the cell to be balanced and the lowest SOC by obtaining the SOC of the cell to be balanced corresponding to the electromotive force of the cell to be balanced and obtaining the lowest SOC corresponding to the electromotive force of the cell having the lowest electromotive force, using the lookup table of the electromotive force and SOC.

Preferably, the total amount of charges is a difference subtracting the lowest state of charge (SOC) from the state of charge (SOC) of the cell to be balanced or an amount of charges of which the cell to be balanced has a value within the allowable deviation when subtracting the total amount of charges from the state of charge (SOC) of the cell to be balanced.

After computing the total amount of charges via the step c), the balancing of the cell to be balanced is performed. The balancing of the cell to be balanced may be a passive balancing using a resistor and an active balancing using a DC/DC converter.

The accumulative amount of charges in the step d) is obtained by measuring the terminal voltage of the cell to be balanced at a regular time interval, finding a balancing amount of charges consumed for a regular time interval using the lookup table of the terminal voltage and the state of charge (SOC), and accumulating the balancing amount of charges.

In other words, the terminal voltage of the cell to be balanced is measured in a prescribed time interval simultaneously when the passive or active balancing of the cell to be balanced is initiated and SOC value corresponding to the terminal voltage measured using the lookup table of the terminal voltage and the SOC is obtained. Therefore, a difference between the SOC corresponding to the terminal voltage measured in a certain time and the SOC corresponding to the terminal voltage after a prescribed time passes from the certain time becomes balancing amount of charges consumed for a prescribed time interval, whereby it is possible to obtain the accumulative amount of charges by accumulating the balancing amount of charges. The balancing of the cell to be balanced is completed when the accumulative amount of charges equals the total amount of charges. The terminal voltage of the cell to be balanced is preferably measured in a time interval of 0.1 to 1 second.

At this time, in order to compensate the error due to the temperature difference, the lookup table used in the step b) or c) is a two-dimensional lookup table of the electromotive force and the temperature with the electromotive force on one axis and the temperature on other axis and the state of charge (SOC).

Further, in order to compensate the error due to the temperature difference, the lookup table used in the step d) is a two-dimensional lookup table of the terminal voltage and the temperature with the electromotive force on one axis and the temperature on other axis and the state of charge (SOC).

Advantageous Effects

The cell balancing method for the high-voltage battery pack has advantages in that it is possible to correctly perform the balancing since the balancing can be performed by measuring the cell electromotive force which is credible without an influence by IR voltage and polarization voltage and it is possible to exclude errors upon operating an active or passive balancing circuit since the balancing can be completed based on the total amount of charges needed for the balancing, whereby the balancing effect can be optimized and thus deviation between the cells can be reduced and further battery lifetime can be increased.

DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

Figure 1:
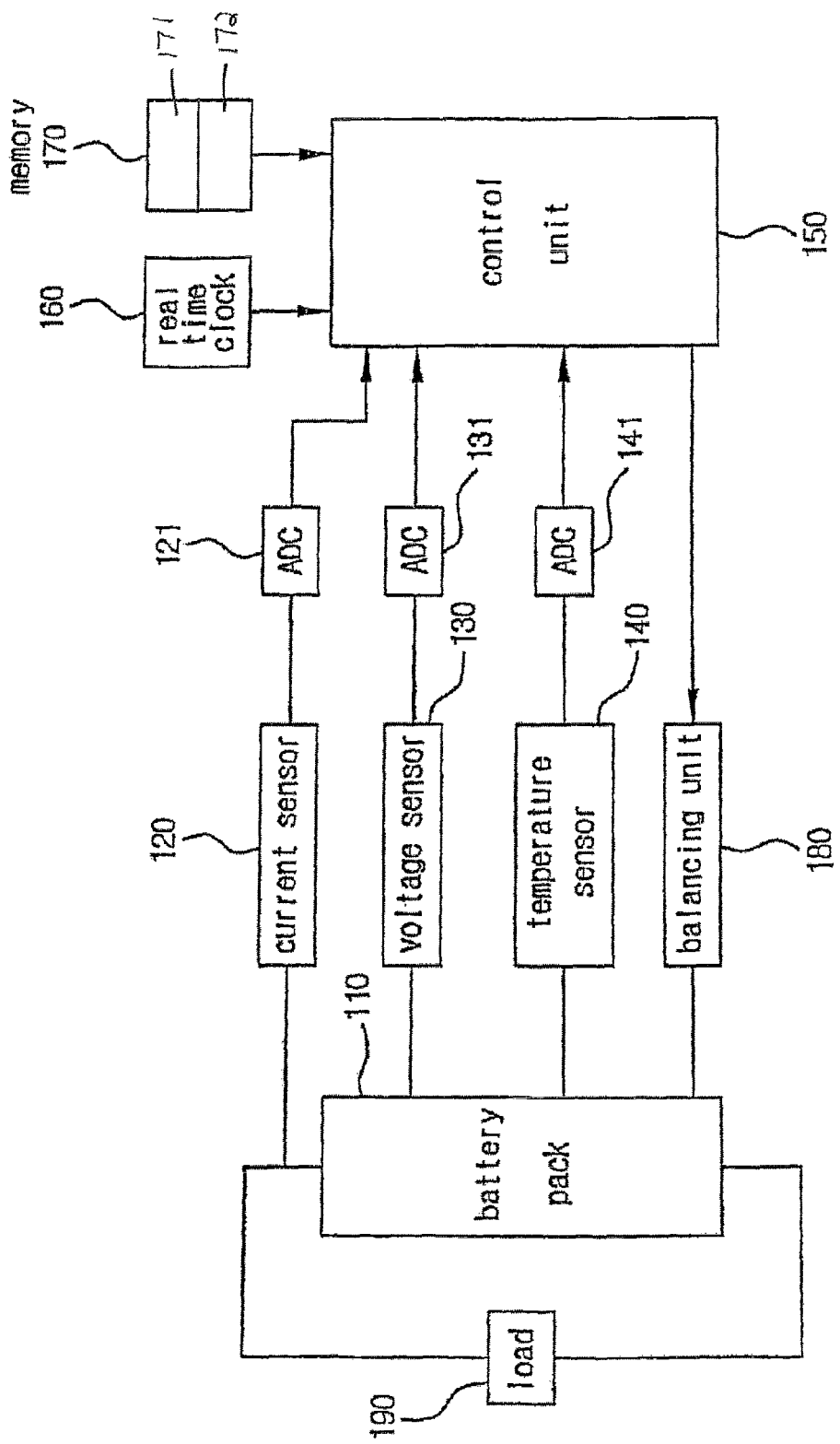
FIG. 1 is a block diagram showing one example of an apparatus implementing a cell balancing method according to the present invention.

| | |
|---|---|
| 110: battery pack | 120: current sensor |
| 130: voltage sensor | 140: temperature sensor |
| 150: control unit | 160: real time clock |
| 170: memory | 180: balancing unit |
| 190: load | 121, 131, 141: ADC |

Best Mode

Hereinafter, an adapter-type power supply apparatus according to the present invention will be described in detail with reference to accompanying drawings. The accompanying drawings are provided as an example sufficiently to deliver an idea of the present invention to the person skilled in the art.

Therefore, the present invention is not bounded by the drawings presented hereinafter but can be specified in another form. Further, like reference numerals denote like element throughout the following detailed description of the invention.

At this time, if the technological terms and science terms used herein do not have any other definition, they have meanings that can be typically understood by the person skilled in the art. Further, known functions and structures which can unnecessary make obscure the subject matter of the present invention in the following description and accompanying drawings will be omitted.

FIG. 1 is a block diagram showing one example of an apparatus implementing a cell balancing method according to the present invention. It is configured with a current sensor 120 which is connected to the battery pack 110 having a plurality of cells (individual battery composing the battery pack) connected in series, parallel or series/parallel to measure the current flowing from the battery pack 110 to a load 190, a voltage sensor 130 which measures a voltage of each cell composing the battery pack 110, a temperature sensor 140 which measures a temperature of the battery pack 110, a balancing unit 180 which performs balancing for the cell to be balanced, and a control unit 150 which is input with outputs from the current sensor 120, the voltage sensor 130 and the temperature sensor 140 and a real-time clock 160 and data pre-stored in a memory 170 obtains reliable electromotive force by discriminating a zero-current state or a low-current state, selects the cell to be balanced, computes a total amount of currents needed for balancing, and controls the balancing unit 180. As shown in FIG. 1, if the outputs from the current sensor 120, the voltage sensor 130 or the temperature sensor 140 are analog outputs, each of the outputs of the sensor 120, 130, 140 can be connected to analog-digital converters (ACD) 121, 131, 141. At this time, the voltage sensor 130 can be configured with a voltage measuring circuit unit (not shown) measuring the voltage and a switch block (not shown) connecting each cell terminal with the voltage measuring circuit unit, and an operation of the voltage sensor 130 is controlled by the control unit 150. The operations of the current sensor 120 and the temperature sensor 140 are independently controlled by the control unit 150. The balancing unit 180 can be configured with a discharging circuit including a resistor, a charging circuit including a DC/DC converter, or a balancing circuit (not shown) including the charging/discharging circuit and a switch block (not shown) connecting each cell terminal with the balancing circuit and an operation of the balancing unit 180 is controlled by the control unit 150.

Figure 2:
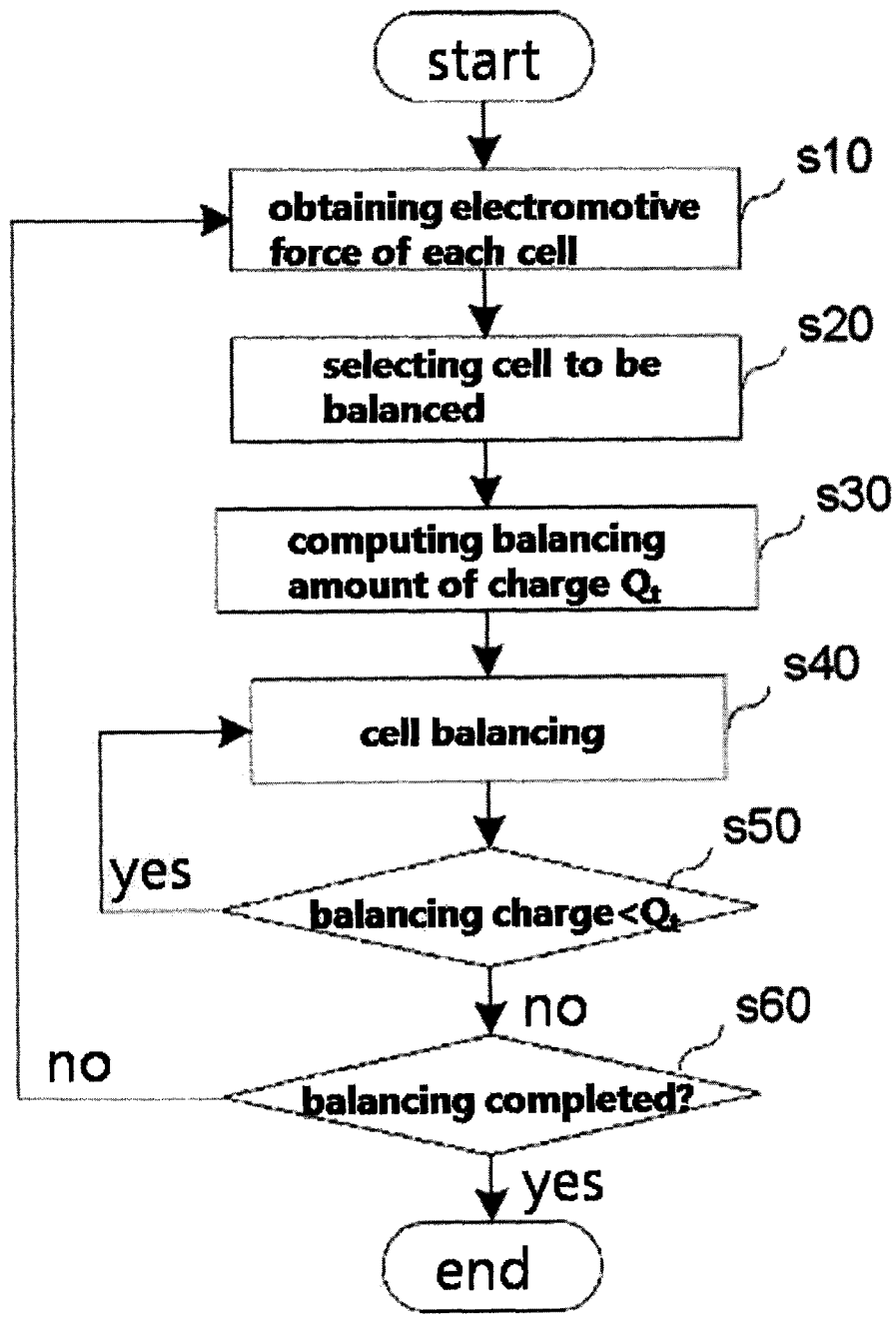
FIG. 2 is a sequence diagram illustrating the cell balancing method according the present invention.

FIG. 2 is a sequence diagram illustrating the cell balancing method according to the present invention, and it will be described on the cell balancing method based on an example of the block diagram of FIG. 1 according to the present invention.

In a step s10 of obtaining the electromotive force of each cell, the control unit 150 discriminates the zero current state or the low current state based on the current value measured by the current sensor 120, discriminates whether the zero current sate is maintained for greater than a first threshold time t1 stored in the memory 170 using the real time clock 160, measures the terminal voltage of individual cell using the voltage sensor 130 if the zero current state is maintained for greater than the first threshold time t1 and uses the terminal voltage of the voltage sensor 130 as an electromotive force of each cell.

If the current value input to the control unit 150 via the current sensor 120 is less than a threshold amount of current i1 pre-stored in the memory 170, it is determined as the low current state and it is determined whether the low current state is maintained while the current is input to the control unit 150 through the current sensor 120 at a uniform time interval. If the low current state is maintained for greater than a second threshold time t2 pre-stored in the memory 170, the terminal voltage of the individual cell is measured using the voltage sensor 130 and the terminal voltage of the voltage sensor 130 is used as the electromotive force of the individual cell. The control unit 150 drives the current sensor 120 at a uniform time interval in order to discriminate whether the low current state is maintained, and preferably the current measurement interval using the current sensor 120 is 0.01 sec to 0.1 sec.

After obtaining the electromotive force of each cell (s10), the control unit 150 selects the cell to be balanced based on the electromotive force of each cell (s20).

Preferably, the cell having a deviation more than an allowable deviation based on the lowest electromotive force is selected as the cell to be balanced. At this time, the allowable deviation is pre-stored in the memory 170.

The step of selecting the cell to be balanced (s20) can be performed based on the state of charge (SOC) of the cell instead of the electromotive force of the cell by obtaining the state of charge (SOC) corresponding to the electromotive force of each cell using a lookup table 171 of the electromotive force, the temperature and the state of charge (SOC) pre-stored in the memory 170.

Herein, the control unit 150 is preferably input with the temperature by controlling an operation of the temperature sensor 140 immediately before or immediately after measuring the terminal voltage of each cell used as the electromotive force of the cell in the step s10 and obtains the corresponding state of charge (SOC) from the lookup table 171 of the electromotive force, the temperature and the state of charge (SOC).

After selecting the cell to be balanced by the control unit 150 (s20), the total amount of charges Qt needed for balancing is computed s30 before a balancing step s40. The total amount of charges Qt is computed based on the state of charge (SOC) of the cell to be balanced corresponding to the electromotive force of the cell to be balanced and the lowest state of charge (SOC) corresponding to the electromotive force of the cell having the lowest electromotive force, using the lookup table 171 of the electromotive force, the temperature and the state of charge (SOC) pre-stored in the memory 170. The total amount of charges Qt computed by the control unit 150 is a difference subtracting the lowest state of charge (SOC) from the state of charge (SOC) of the cell or an amount of charges of which the cell to be balanced has a value within the allowable deviation when subtracting the total amount of charges Qt from the state of charge (SOC) of the cell to be balanced.

After computing the total amount of charges Qt by the control unit 150, the balancing of the cell to be balanced is performed s40. At this time, the control unit 150 is input with the terminal voltage of the cell to be balanced on which the balancing is performed at a regular time interval by controlling the voltage sensor 130 while performing the balancing of the cell to be balanced by controlling the balancing unit 180. The control unit 150 obtains the state of charge (SOC) corresponding to the terminal voltage input using the terminal voltage input to the control unit 150 at the regular time interval and the lookup table 172 of the terminal voltage, the temperature and the state of charge (SOC) pre-stored in the memory 170, obtains a balancing amount of charges (=state of charge (SOC) obtained for a certain time-state of charge (SOC) obtained immediately before consumed for the certain time) for the regular time interval based on the state of charge (SOC) obtained in the regular time interval, and obtains accumulative amount of charges by accumulating the balancing amount of charges. At this time, the control unit 150 completes balancing by controlling the balancing unit 180 when the accumulative amount of charges equals total amount of charges by comparing the accumulative amount of charges with the total amount of charges. Preferably, the time interval upon measuring the terminal voltage is 0.1 sec to 1 sec at the course of balancing.

At this time, after completing balancing of the cell to be balanced, the cell balancing can be performed for the battery pack in a successive loop by repeating the step s10 to step s50 (s60). The balancing is completed when the accumulative amount of charges equals the total amount of charges but the balancing is substantially completed at a time of point when the accumulative amount of charge is more than the total amount of charges Qt.

The memory 170 in which a reference parameter and a lookup table are stored is preferably ROM in the cell balancing method according to the present invention. The control unit can include a memory (not shown) temporally storing the terminal voltage, the amount of charges, the temperature, and the clock (time) information of individual cell, and the state of charge (SOC) value, the accumulative amount of charges, and the total amount of charge in each step.

INDUSTRIAL APPLICABILITY

According to the present invention, the cell balancing method for the high-voltage battery pack has advantages in that it is possible to correctly perform the balancing since the balancing can be performed by measuring the cell electromotive force which is credible without an influence by IR voltage and polarization voltage and it is possible to exclude errors upon operating an active or passive balancing circuit since the balancing can be completed based on the total amount of charges needed for the balancing, whereby the balancing effect can be optimized and thus deviation between the cells can be reduced and further battery lifetime can be increased.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A cell balancing method for a high-voltage battery pack, comprising steps of:
   a) measuring an electromotive force of each cell composing the battery pack;
   b) selecting a cell to be balanced based on the electromotive force of each cell;
   c) computing a total amount of charges used for balancing of the cell to be balanced from a state of charge (SOC) of each cell corresponding to the electromotive force of each cell using a lookup table, the lookup table being a two-dimensional lookup table of the electromotive force, a temperature and the state of charge (SOC);
   d) obtaining an accumulative amount of charges by measuring a terminal voltage of the cell to be balanced at a regular time interval when performing the balancing, finding a balancing amount of charges consumed for the regular time interval using another lookup table, and accumulating the balancing amount of charges while performing the balancing of the cell to be balanced, the other lookup table being a two-dimensional lookup table of the terminal voltage, the temperature and the state of charge (SOC);
   e) completing the balancing of the cell to be balanced when the accumulative amount of charges equals the total amount of charges, wherein:
   step a) further comprises the steps of:
      (a1) discriminating whether or not a zero current state exists in which the current is not supplied from the battery pack to a load which is connected to the battery pack in a manner capable of receiving the current from the battery pack;
      (a2) measuring a terminal voltage of each cell composing the battery pack to use the measured terminal voltage of each cell as the electromotive force of each cell when a duration time of the zero current state is greater than a first threshold time t1 if the zero current state exists; and
      (a3) measuring the terminal voltage of each cell composing the battery pack to use the measured terminal voltage of each cell as the electromotive force of each cell when the current of the battery pack of less than a threshold amount of current i1 flows for greater than a second threshold time t2, if the zero current state does not exist;
   the first threshold time t1 and the second threshold time t2 are 30 seconds to 60 seconds independently from each other, respectively; and
   the threshold amount of current i1 is up to 3 A.

2. The cell balancing method according to claim 1, wherein step b) comprises selecting the cell having a deviation greater than an allowable deviation from a lowest electromotive force as the cell to be balanced.

3. The cell balancing method according to claim 2, wherein the allowable deviation is in a range of 2% to 5%.

* * * * *

UNITED STATES PATENT AND TRADEMARK OFFICE
CERTIFICATE OF CORRECTION

PATENT NO.         : 8,648,570 B2                                            Page 1 of 1
APPLICATION NO. : 12/808331
DATED              : February 11, 2014
INVENTOR(S)        : Lim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 305 days.

Signed and Sealed this

Twenty-ninth Day of September, 2015

Michelle K. Lee
*Director of the United States Patent and Trademark Office*